(12) United States Patent
Yamasaki et al.

(10) Patent No.: US 7,465,890 B2
(45) Date of Patent: Dec. 16, 2008

(54) ROTATIONALLY-OPERATED ELECTRONIC COMPONENT

(75) Inventors: Masato Yamasaki, Tsuyama (JP); Takumi Nishimoto, Tsuyama (JP); Jun Sato, Tsuyama (JP); Takahiro Nishimura, Tsuyama (JP)

(73) Assignee: Panasonic Corporation, Osaka (JP)

( * ) Notice: Subject to any disclaimer, the term of this patent is extended or adjusted under 35 U.S.C. 154(b) by 907 days.

(21) Appl. No.: 10/979,728

(22) Filed: Nov. 2, 2004

(65) Prior Publication Data

US 2005/0110782 A1 May 26, 2005

(30) Foreign Application Priority Data

Nov. 21, 2003 (JP) ............................. 2003-392221

(51) Int. Cl.
*H01H 19/00* (2006.01)
*H01H 21/00* (2006.01)

(52) U.S. Cl. .............................. 200/11 TW; 200/11 R
(58) Field of Classification Search ............. 200/11 TW
See application file for complete search history.

(56) References Cited

U.S. PATENT DOCUMENTS 6,555,768 B2 * 4/2003 Deruginsky et al. ............ 200/4
6,642,459 B2 * 11/2003 Chou et al. ............. 200/11 TW
7,012,201 B2 * 3/2006 Kodani et al. ................. 200/14
7,094,982 B2 * 8/2006 Liu ............................ 200/336

FOREIGN PATENT DOCUMENTS

JP 2001-148219 5/2001

* cited by examiner

*Primary Examiner*—Elvin G Enad
*Assistant Examiner*—Lheiren Mae A Anglo
(74) *Attorney, Agent, or Firm*—RatnerPrestia

(57) ABSTRACT

A rotationally-operated electronic component in which a predetermined signal is obtained by rotating a roller-shaped operating dial, and a detent generating mechanism can easily be disposed even when the diameter of the operating dial is reduced. The rotationally-operated electronic component is configured in such a manner that the detent generating mechanism for the operating dial is stored within a recess formed on the left circular portion with coil spring being deflected, and with an urging force of coil spring, movable clicking member is brought into resilient contact with fixed clicking member on the outside thereof. Accordingly, even when the diameter of the operating dial is reduced, the detent generating mechanism can be disposed easily and the preferable detent feeling can be maintained for a long time.

7 Claims, 8 Drawing Sheets

ROTATIONALLY-OPERATED ELECTRONIC COMPONENT

FIELD OF THE INVENTION

The present invention relates to a rotationally-operated electronic component used for an input operation element of various electronic devices, which obtains a predetermined signal by rotating a roller-type operating dial.

BACKGROUND OF THE INVENTION

In recent years, an increased number of electronic devices employ a system to display various menus on a display device for allowing the user to execute desired operation while moving a cursor thereon. A method of input operation, which is performed by rotating a disk-shaped or a roller-shaped rotary member, is increasingly employed.

Since a rotationally-operated electronic component provided with the roller-shaped rotary member is superior in operability with a thumb, it is often mounted, for example, to mobile equipment as an input control element.

Referring now to FIG. 10 to FIG. 12, a rotationally-operated electronic component employing the roller-shaped rotary member in the related art will be described.

FIG. 10 is a schematic perspective view showing an appearance of the rotationally-operated electronic component employing the roller-shaped rotary member in the related art, FIG. 11 is a cross-sectional view of the same, and FIG. 12 is an exploded perspective view of the same.

In these drawings, operating dial 1 having an outline of cylindrical roller is provided with contact brush 3 in a recess formed on its right circular portion so as to rotate together with operating dial 1. Rotary contact point 2 such as an encoder includes contact point substrate 5 having fixed contact point 4, with which an extremity of brush member 3A of contact brush 3 comes into resilient contact, and contact brush 3. Detent generating mechanism 9 is provided on the left circular portion for providing the user a detent feeling synchronously with a predetermined output signal from rotary contact point 2.

Detent generating mechanism 9 includes detent spring 6 formed of a metallic thin plate mounted to the recess formed on the left circular portion of operating dial 1 so as to be capable of synchronous rotation and fixed cricking member 7 formed of resin and provided on the end surface of the left circular portion thereof in a fixed state.

Detent spring 6 is formed of a plate-shaped spring member doubled by folding back, and is formed with dowel 6A at a plate portion located on the end surface side of the left circular portion.

When dowel 6A comes into resilient contact with concavo-convex portion 7A of fixed clicking member 7, a detent feeling is obtained synchronously with the rotation of operating dial 1.

The detent feeling and an electric signal obtained from rotary contact point 2 are adapted to be synchronized.

Operating dial 1 is rotatably held by contact point substrate 5 of rotary contact point 2 and fixed clicking member 7 of detent generating mechanism 9 from both sides thereof.

With the rotationally-operated electronic component employing the roller-shaped rotary member in the related art as described above, the predetermined signal can be obtained from rotary contact point 2 by rotating operating dial 1 and, upon operation, and a predetermined detent feeling is obtained from detent generating mechanism 9.

Since the structure shown in these drawings are the one in which pressing operation is also enabled in addition to the rotary operation of operating dial 1, switch 8 which comes into and out of contact with the pressing operation is shown. However, description of the components or the operation relating to the pressing operation is omitted.

The rotationally-operated electronic component using the roller-shaped rotary member in the related art is disclosed, for example, in JP-2001-148219.

SUMMARY OF THE INVENTION

A rotationally-operated electronic component including: a cylindrical roller-shaped operating dial provided with a rotary mechanism such as a rotary contact point on the right circular portion and a detent generating mechanism on the left circular portion, wherein the detent generating mechanism includes:
a coil spring disposed in a state of being deflected coaxially with the center axis of rotation of the operating dial with respect to an intermediate wall in the operating dial; and
a movable clicking member disposed in a state of being stored in the operating dial and urged toward the end surface of the left circular portion by an urging force of the coil spring, and is in resilient contact with a fixed clicking member disposed in a state of being fixed to the end surface side of the left circular portion, wherein the coil spring and the movable clicking member rotate synchronously with the rotation of the operating dial; and wherein a projection projected toward the end surface of the left circular portion of the movable clicking member climbs over the projection projected toward the intermediate wall of the fixed clicking member when being rotated, which provides the user a detent feeling together with a deflecting force of the coil spring in accordance with the movement of the movable clicking member toward the center axis of rotation.

DETAILED DESCRIPTION OF THE EXEMPLARY EMBODIMENTS

In association of reduction of size and thickness of equipment in the recent years, reduction of size and thickness of a rotationally-operated electronic component in the related art to be mounted thereon are also required, whereby downsizing and reduction of diameter of an operating dial are in progress.

Under such circumstances, the rotationally-operated electronic component in the related art as described above generates detent by detent generating mechanism 9 in which dowel 6A, which is formed at a location on detent spring 6 formed by folding up a plate-shaped spring member, slides resiliently on concavo-convex portion 7A formed of resin. However, since the length of the spring where dowel 6A is formed is shortened with decrease in diameter of operating dial 1, detent generating mechanism 9 is adapted to obtain a required resilient contact force by changing the thickness of the spring member or devising the shape of the spring.

However, such measure in terms of design takes time. In addition, the measure also has a limit, and hence a new structure of the detent generating mechanism in which a required resilient contact force can be obtained easily irrespective of reduction of the diameter of operating dial 1 is demanded.

In order to solve the problems as described above in the related art, it is an object of the invention to provide a rotationally-operated electronic component including a detent generating mechanism which can be disposed easily even in the case where the diameter of the operating dial is reduced, and can secure a resilient contact state with a large resilient contact force, so that a preferable detent feeling can be maintained for a long time.

Referring now to FIG. 1 to FIG. 9, an embodiment of the invention will be described.

Embodiment

Figure 1:
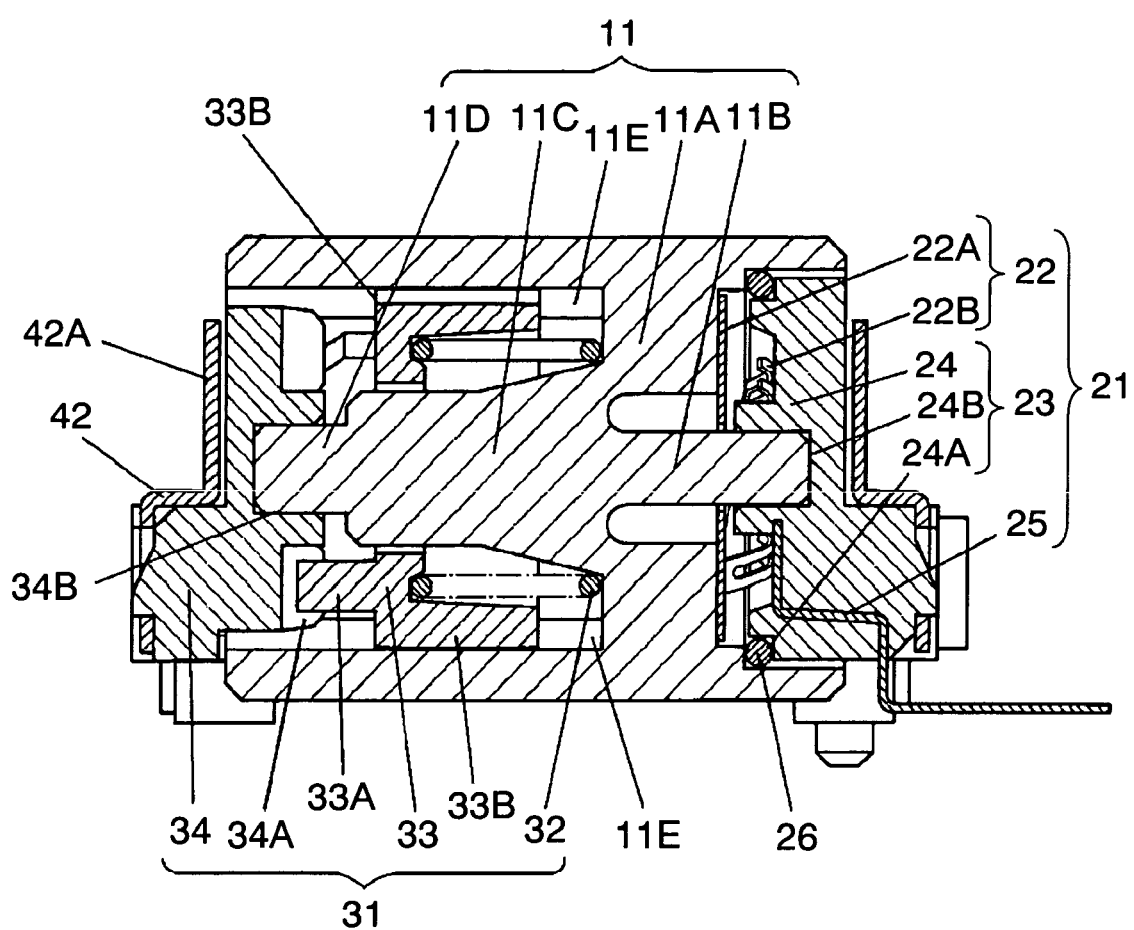
FIG. 1 is a cross-sectional view showing a rotationally-operated electronic component according to an embodiment of the present invention.
Figure 2:
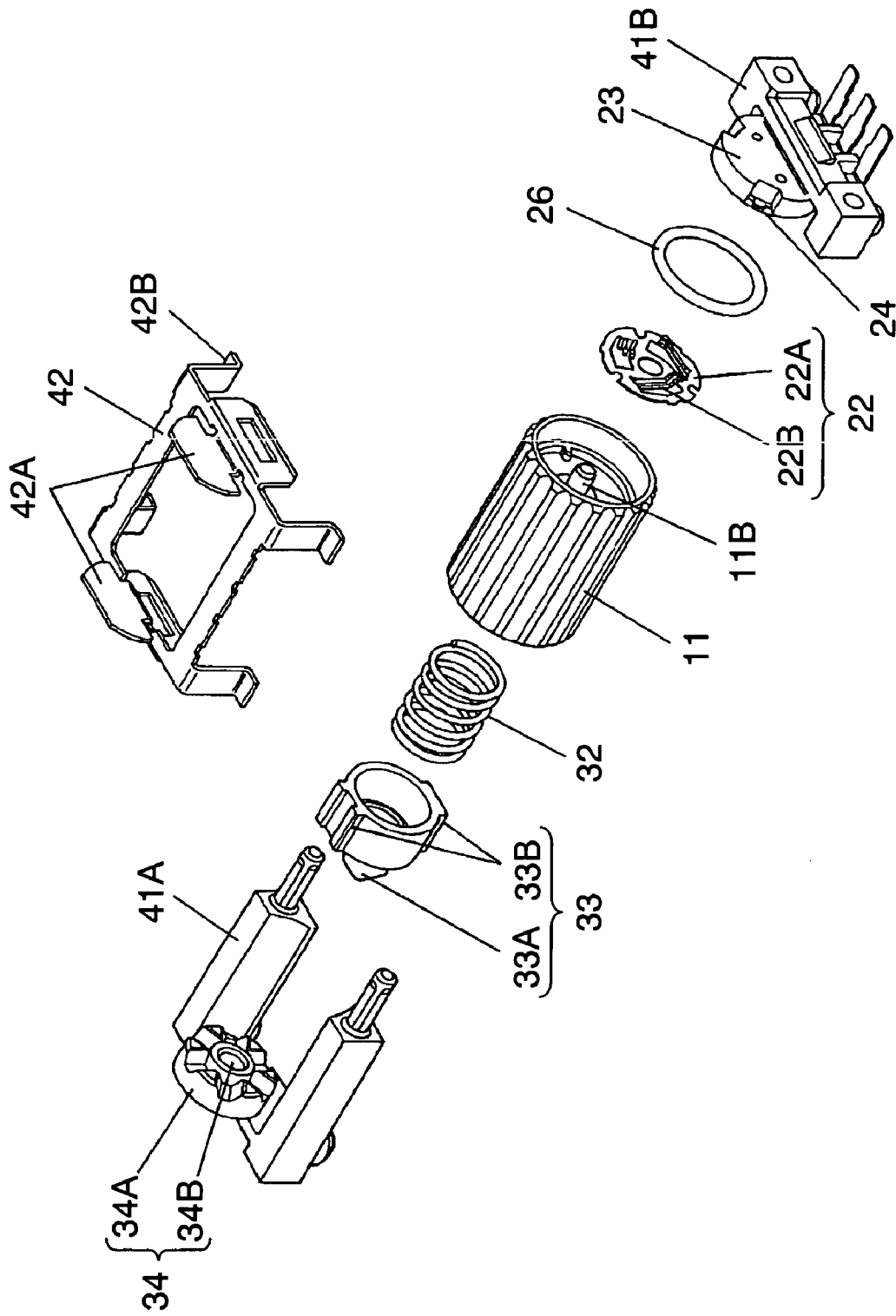
FIG. 2 is an exploded perspective view of the rotationally-operated electronic component according to the embodiment of the invention when viewed from the right side.
Figure 3:
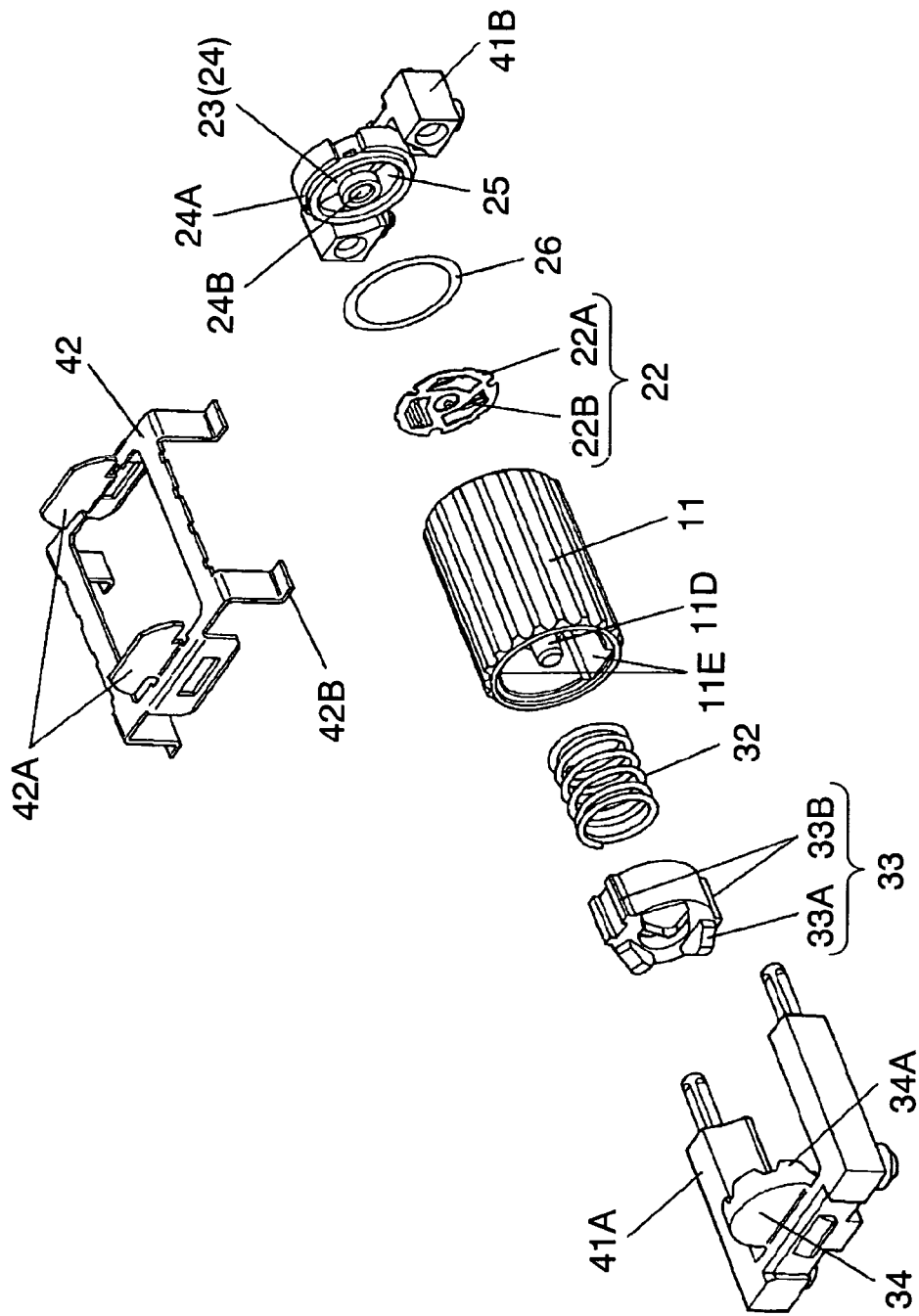
FIG. 3 is an exploded perspective view of the rotationally-operated electronic component according to the embodiment of the invention when viewed from the left side.
Figure 4:
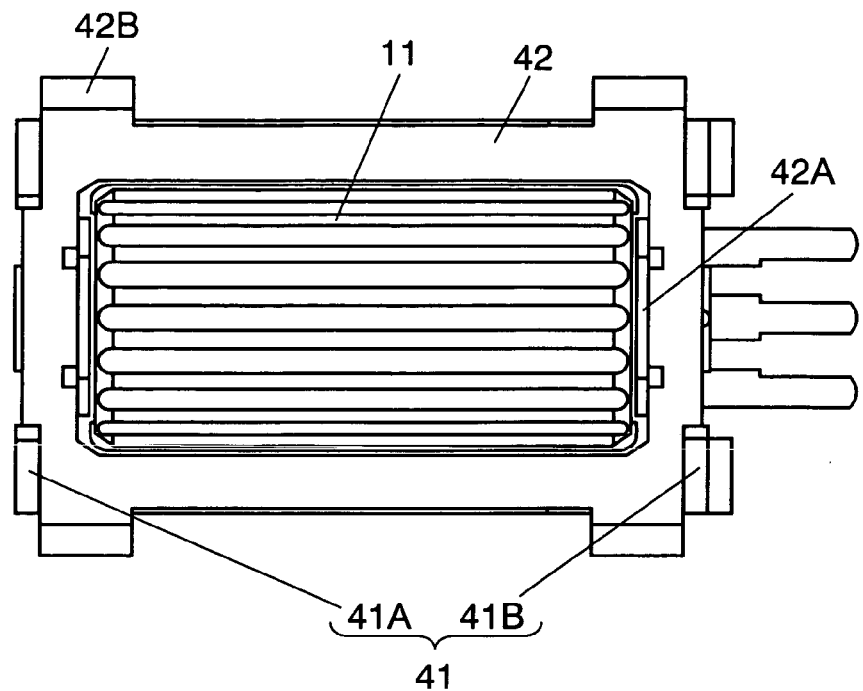
FIG. 4 is a top view of the rotationally-operated electronic component according to the embodiment of the invention.
Figure 5:
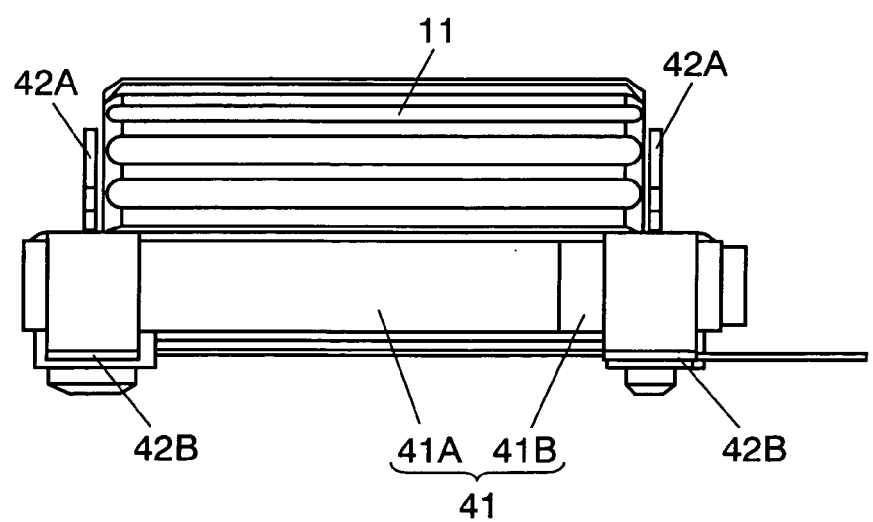
FIG. 5 is a side view of the rotationally-operated electronic component according to the embodiment of the invention.
Figure 6:
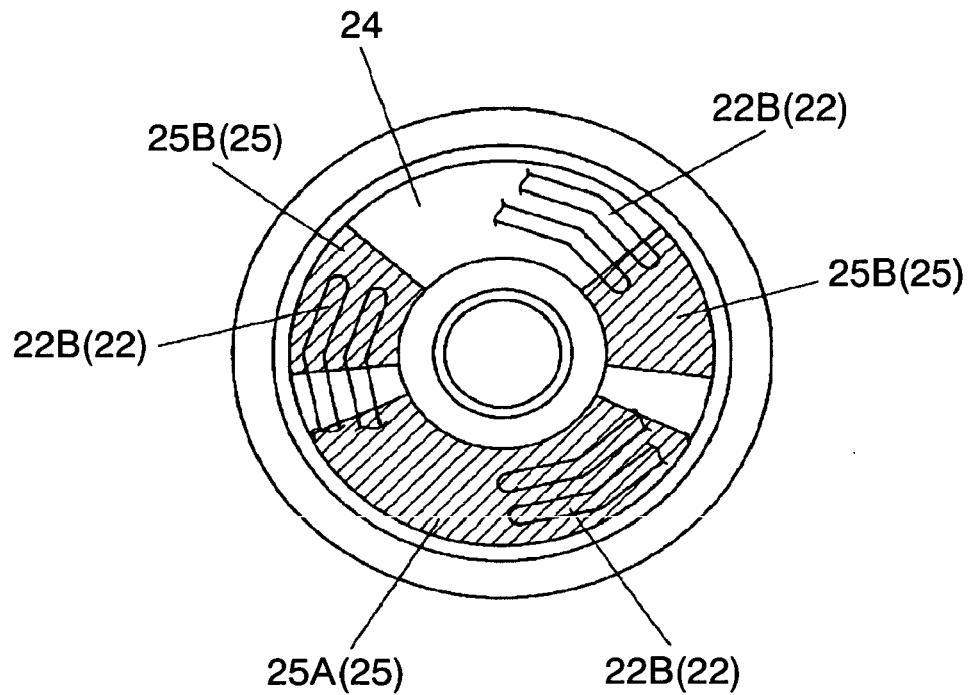
FIG. 6 is a plan view showing an engaging state between a contact brush of a rotary contact point and a fixed contact point, which are principal portions of the same.

FIG. 1 is a cross-sectional view showing a rotationally-operated electronic component according to an embodiment of the invention. FIG. 2 is an exploded perspective view of the same when viewed from the right side. FIG. 3 is an exploded perspective view of the same when viewed from the left side. FIG. 4 is a top view of the same. FIG. 5 is a side view of the same. FIG. 6 is a plan view showing an engaging state between a contact brush of a rotary contact point and a fixed contact point, which are principal portions of the same.

In these drawings, substantially cylindrical operating dial 11 is molded resin formed with circular recesses on left and right circular side portions, and intermediate wall 11A is formed between the bottoms of the recesses.

Contact brush 22 which constitutes part of rotary contact point 21 is fixed to the bottom of the recess on the right circular portion in alignment with the center axis of the cylinder and so as to be capable of rotating together with operating dial 11.

There is disposed right center shaft 11B at the center position of the bottom of the recess on the right circular portion of operating dial 11 so as to be aligned with the center axis of dial 11.

Contact brush 22 is formed of a resilient metal thin plate and is provided with three sets of brush members 22B formed by bending in an inclined state so as to project outwardly of dial 11 at a pitch of 120° on substantially flat ring-shaped brush body 22A. The extremities of respective brush members 22B are in resilient contact with the surface of contact-point-disposed portion 24 of contact point substrate 23 disposed in a fixed state so as to close the recess on the right circular portion of operating dial 11.

On an opposed surface of contact-point-disposed portion 24 with respect to contact brush 22, fixed contact point 25 is disposed in an exposed state in a predetermined pattern.

As shown in the plan view in FIG. 6, fixed contact point 25 includes common contact point 25A and two signal contact points 25B formed respectively into a substantially fan-shape and disposed side-by-side in an electrically independent state from each other. The structure is such that rectangular outputs shifted in phase are obtained between terminals of common contact point 25A and respective signal contact points 25B by three brush members 22B of contact brush 22 slid in sequence thereon. In other words, it is adapted so that the output of the two-phase incremental encoder can be obtained.

In FIG. 6, the portion of fixed contact point 25 is shadowed by oblique lines for the sake of clarity.

Contact-point-disposed portion 24 is disposed in a state of being stored in the recess on the right circular portion of operating dial 11 in a state in which O-ring 26 formed into an O-shape and a circular shape in cross section is fitted on shoulder 24A formed along the entire circumference of thereof. In this state, O-ring 26 is in resilient contact with the bottom surface of the recess on the right circular portion.

The resilient contact state between O-ring 26 and the bottom surface of the recess on the right circular portion is maintained while operating dial 11 is rotating.

O-ring 26 is disposed for reducing intrusion of dust or water into rotary contact point 21, and in this arrangement, air-tight property at rotary contact point 21 increases easily, and hence dust-proof and drip-proof properties are improved.

On the other hand, detent generating mechanism 31 includes coil spring 32 stored in the recess on the left circular portion of operating dial 11, movable clicking member 33 formed of resin and stored in the recess, and fixed clicking member 34 formed of resin and disposed in a fixed manner.

The structure of the detent generating mechanism 31 will be described further in detail. The recess on the left circular portion of operating dial 11 is formed with conical portion 11C projecting outwardly from the bottom thereof coaxially with the center axis of rotation of dial 11. The extremity of conical portion 11C is constructed as left center shaft 11D.

The diameter of the root portion of conical portion 11C which continues from the bottom surface of the left recess is set to the value equal to or slightly larger than the inner diameter of a seat of coil spring 32.

Coil spring 32 is inserted into conical portion 11D. Coil spring 32 is disposed coaxially with the center axis of operating dial 11, and with this arrangement, coil spring 32 is easily positioned coaxially with dial 11, whereby the number of assembling steps can be reduced.

When the diameter of the root portion of conical portion 11C is slightly larger than the inner diameter of the seat of coil spring 32, it is preferable to insert coil spring 32 into conical portion 11D, press-fit the same so that the seat of coil spring 32 comes into abutment with the bottom surface of the left recess, and aligns the level of coil spring 32 after being mounted, because the detent feeling is not fluctuated.

Coil spring 32 comes into resilient abutment with movable clicking member 33 disposed in a state of being also stored in the recess along the entire circumference of the seat on the other side in a deflected state. Movable clicking member 33 is urged toward the opening of the left recess by the urging force of coil spring 32 and is brought into the resilient contact with fixed clicking member 34 disposed in a fixed state.

On the outer periphery of movable clicking member 33, outer peripheral projections 33B configured for functioning as guided portions are disposed at upper and lower positions, respectively.

On the other hand, as a guiding portion corresponding to the pair of outer peripheral projections 33B, a pair of guiding grooves 11E extending in parallel with the direction of the center axis of rotation operating dial 11 are disposed on the inner wall of the recess disposed on the left circular portion of operating dial 11. Respective outer peripheral projections 33B are movably engaged with respective guiding grooves 11E.

In this case, since respective guiding grooves 11E are disposed in parallel with the direction of the center axis of rotation of operating dial 11, movable clicking member 33 can be moved in parallel with the direction of the center axis of rotation of operating dial 11 while outer peripheral projections 33B are guided by guiding grooves 11E.

On the opposed surfaces of movable clicking member 33 and fixed clicking member 34, convexes 33A, 34A are disposed respectively at an equal angular pitch. The extremity of convex 33A or 34A is in abutment with the opposed surface on the other side.

According to the present embodiment, three convexes 33A and six convexes 34A are shown in the drawing, inclination of movable clicking member 33 can be prevented also during operation as long as at least three of those are disposed at an equal angular pitch.

Each convex 33A is formed substantially into a triangular shape having an arcuate at a predetermined diameter at the extremity thereof in side view.

Each convex 34A is formed substantially into a trapezoidal shape being longer on the bottom side than the upper side, which is located on the side of the extremity in side view.

Operating dial 11 having rotary contact point 21 and detent generating mechanism 31 on the left and right circular portions respectively as described above is rotatably retained at right center shaft 11B and left center shaft 11D by right retaining portion 24B and left retaining portion 34B, respectively. Right retaining portion 24B is disposed at the center of contact-point-disposed portion 24 of contact point substrate 23, and left retaining portion 34B is provided on fixed clicking member 34.

Fixed clicking member 34 and contact point substrate 23 are configured on square C-shaped member 41A and straight member 41B for connecting the opening thereof, respectively as shown in FIG. 2 and FIG. 3. Square C-shaped member 41A and straight member 41B are connected by caulking or the like, and are formed into frame member 41 of a rectangular shape in top view (See top view in FIG. 4 and side view in FIG. 5).

As described above, operating dial 11 is rotatably retained by fixed clicking member 34 and contact point substrate 23 respectively from the circular portions so that the predetermined amount of dial 11 projects above frame member 41. Fixed clicking member 34 is disposed about at the center of the portion which connects arm members of the square C-shaped member 41A. Contact point substrate 23 is disposed at the center of straight member 41B.

Cover 42 formed of metallic thin plate is mounted to the portion of frame member 41 other than dial 11.

It is preferable if cover 42 is adapted so as to be capable of being mounted to frame member 41 with a snap system, as shown in FIG. 1 to FIG. 3 since workability is improved. Simultaneously, a structure having a portion for maintaining the connected state between the square C-shaped member 41A and straight member 41B for connecting the opening thereof after having mounted is preferable.

Cover 42 is provided with a pair of earth plate members 42A formed so as to project upward from the sides. Earth plate members 42A are mounted so as to be disposed on the outsides of the left and right circular portions of operating dial 11.

Cover 42 is provided with terminals 42B on the lower portion thereof. Terminals 42B are configured so as to be capable of being fixed by soldering to an earth circuit of equipment being used.

The rotationally-operated electronic component according to the present embodiment is configured as described above.

Subsequently, the operation of the rotationally-operated electronic component will be described. When operating dial 11 is rotated, rotary contact point 21 and detent generating mechanism 31 function synchronously.

In other words, rotary contact point 21 generates a two-phase incremental encoder signal when contact brush 22 moves together with dial 11 and the brush member 22B moves on contact-point-disposed portion 24.

On the other hand, in detent generating mechanism 31, coil spring 32 and movable clicking member 33 rotate together with dial 11.

Figure 7:
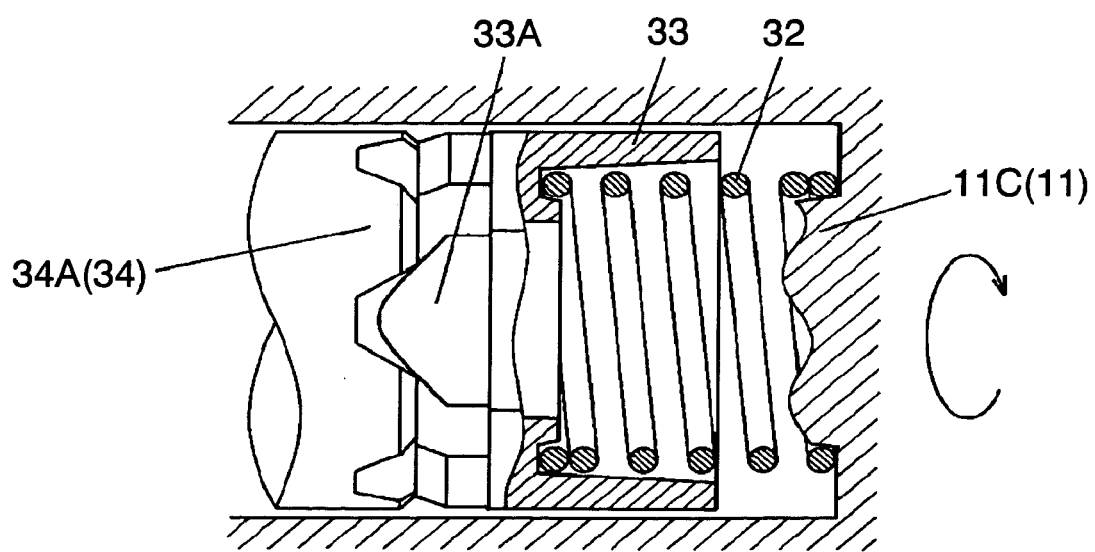
FIG. 7 is a drawing showing a detent generating mechanism, which is a principal portion of the rotationally-operated electronic component according to the embodiment of the invention, in a stable state.

FIG. 7 shows a state before detent generating mechanism 31 is being operated. Movable clicking member 33 is urged by coil spring 32 outwardly of dial 11. Therefore, convex 33A thereof is fitted between convexes 34A of fixed clicking member 34 in a fixed state and hence a stable stopped state is achieved.

Figure 8:
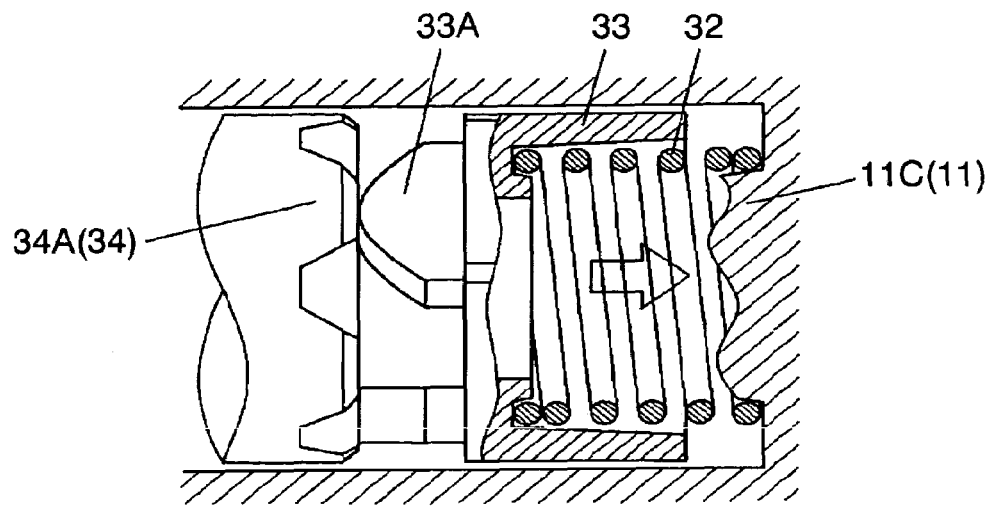
FIG. 8 is a drawing showing a state in which the detent generating mechanism, which is a principal portion of the rotationally-operated electronic component is operating, according to the embodiment of the invention.

FIG. 8 shows a state in which a rotary operation is applied on dial 11. Convex 33A of movable clicking member 33 rotates so as to climb over convex 34A of fixed clicking member 34 to further deflect coil spring 32.

In other words, since fixed clicking member 34 at this moment is in a fixed state, movable clicking member 33 moves horizontally toward the inside of dial 11 while outer peripheral projections 33B are guided by guiding grooves 11E of dial 11.

With the arrangement of guiding device, generation of tilting or angular deformation of movable clicking member 33 upon movement as described above, is reduced, whereby possibility of generation of twisting of coil spring 32 disposed therein may be reduced.

Since convexes 33A, 34A are disposed at least at three positions at an equal angular pitch, movable clicking member 33 does not incline with respect to fixed clicking member 34 even during operation.

The urging force of coil spring 32 increases with the horizontal movement into dial 11 of movable clicking member 33, and hence a sliding force between convexes 33A, 34A increases.

After further rotation and climbing-up between convexes 33A, 34A are completed, movable clicking member 33 is returned to its original state by the urging force of coil spring 32. Since the urging force contributes to assist the rotary operation, the sliding force after climbing-up is reduced.

With this arrangement, it can provide a heavy feeling with the urging force of coil spring 32 to the user until climbing-up between convexes 33A, 34A is completed, and subsequently, a light feeling with the urging force of coil spring 32. This provides the user a distinctive detent. Since the configuration is made such that resin projections 33a, 34A are slid with respect to each other, a stable detent feeling is provided for a long time without much abrasion.

The wounding diameter, the number of turns, and material of coil spring 32, or the shape, positioning, or the number of the respective convexes 33A and 34A may be set as needed according to the required detent feeling.

As described above, the rotationally-operated electronic component according to the present embodiment can provide the electric signal from rotary contact point 21 synchronized with rotary operation of operating dial 11 and the detent feeling from detent generating mechanism 31. In particular, the detent feeling is provided distinctively in a stabled manner for a long time.

Detent generating mechanism 31 has a configuration having coil spring 32 in operating dial 11 so as to be capable of using the urging force of coil spring 32. Therefore, the internal area in operating dial 11 is effectively utilized and dial 11 which is reduced in diameter can easily be disposed.

Since it is configured to provide the detent using coil spring 32, the required resilient contact force between clicking members 33, 34 can be secured sufficiently. In addition, convexes 33A, 34A of clicking members 33, 34 can be formed of resin. When employing resin for the resilient sliding system, generation of abrasion at the sliding portion can be reduced, whereby light, clear, and preferable feeling of the detent can be obtained for a long time.

In the case where significant creak is generated when convexes 33A and 34A formed of the above described resin slide with respect to each other, such generation of creak can be controlled by employing different types of resin material.

Figure 9:
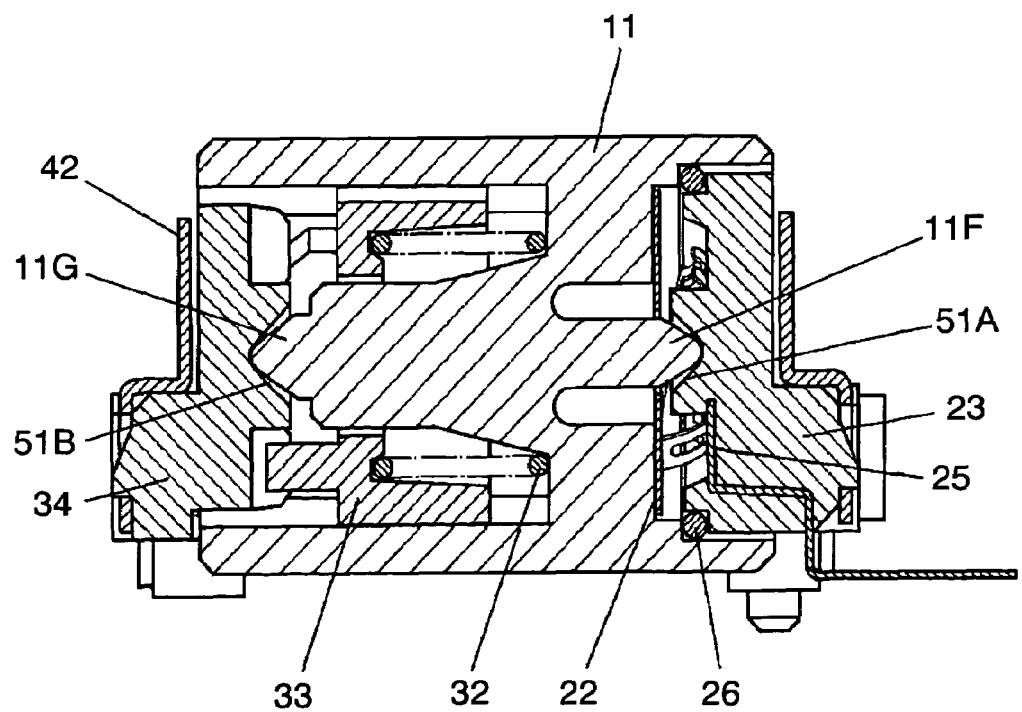
FIG. 9 is a cross-sectional view in which a holding portion of an operating dial, which is a principal portion of the rotationally-operated electronic component, according to the embodiment of the invention is replaced by another structure.
Figure 10:
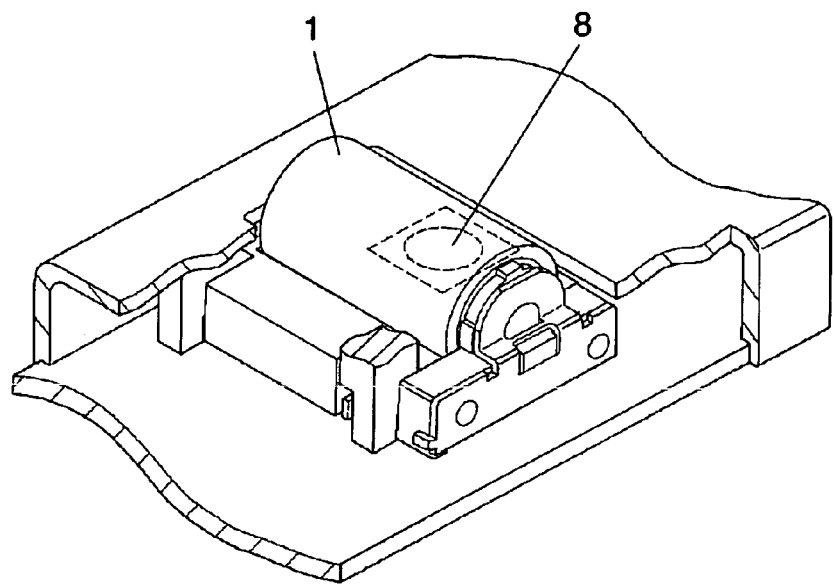
FIG. 10 is a schematic perspective view of an appearance of the rotationally-operated electronic component employing a roller-shaped rotary member in the related art.
Figure 11:
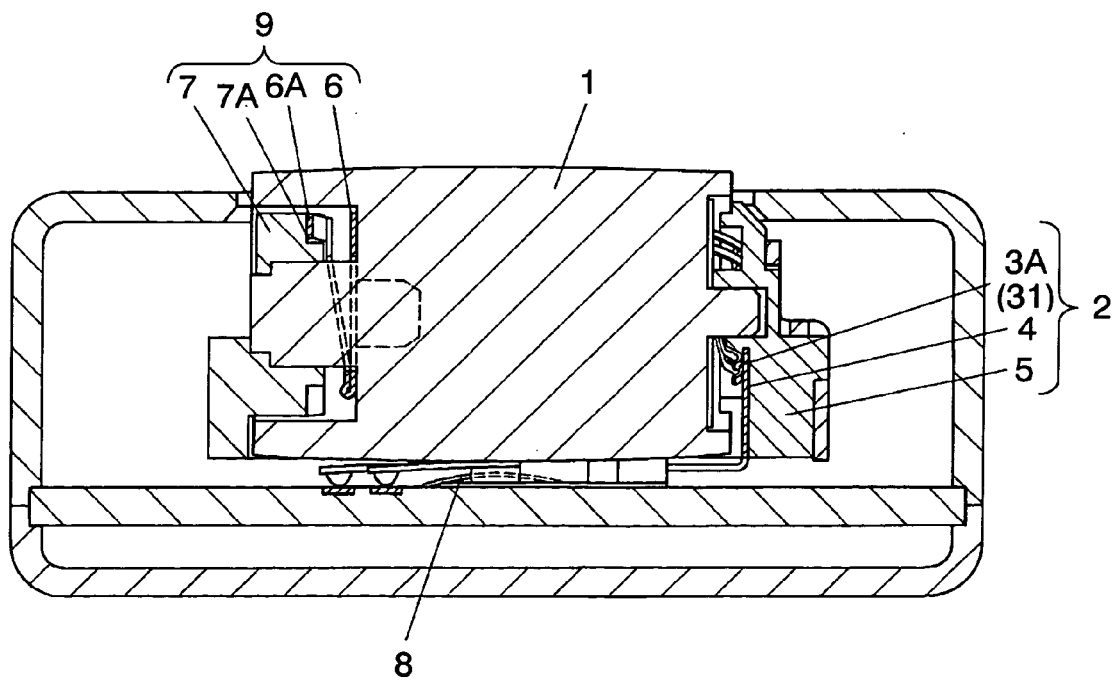
FIG. 11 is a cross-sectional view of the rotationally-operated electronic component employing the roller-shaped rotary member in the related art.
Figure 12:
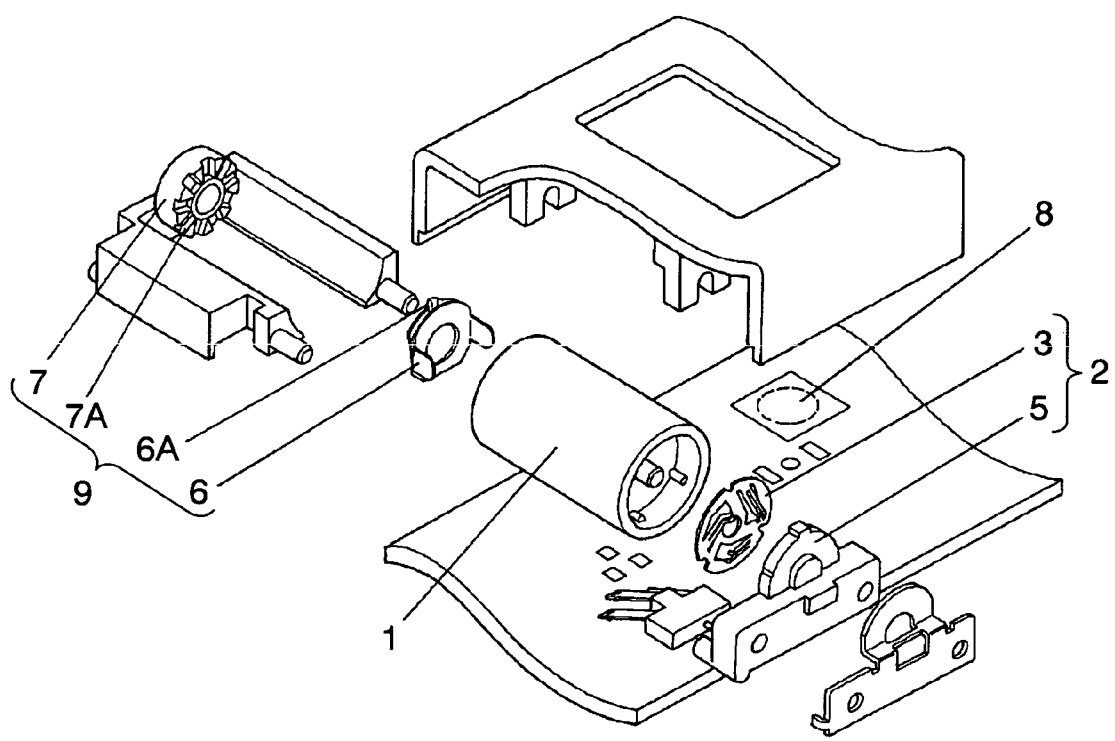
FIG. 12 is an exploded perspective view of the rotationally-operated electronic component employing the roller-shaped rotary member in the related art.

FIG. 9 is a cross-sectional view in which a holding portion of operating dial is replaced by another structure. As a portion for rotatably retaining operating dial 11, the extremities of right center shaft 11F and left center shaft 11G are formed into a conical shape. By allowing the respective extremities to be retained at the deepest bottom positions of right retaining portion 51A and left retaining portion 51B provided in a cone-shaped manner as retaining portions of the retaining members in a point-fitted state, variations in rotation upon rotating operating dial 11 may be reduced with respect to the case of surface-fitted state, whereby the rotating state is stabled.

According to the configuration of the detent generating mechanism of the invention, even with the operating dial reduced in diameter, the internal portion of the dial can be efficiently utilized in the longitudinal direction, and the required resilient contact force between the clicking members can be secured with the urging force of the coil spring. When the operating dial is rotated, it can be rotated by an urging force of the coil spring as described above while maintaining the above-described state. Therefore, the mechanism which can realize a stable detent feeling when the convexes are climbed up with respect to each other is provided.

According to the invention, when the movable clicking member is moved in the operating dial upon operation, prevention of tilting of the movable clicking member can be facilitated, and kinking of the coil spring disposed inwardly thereof can be reduced.

According to the invention, the coil spring can be disposed easily within the operating dial with the centerline of the coil spring and the center axis of rotation of the operating dial aligned with respect to each other.

According to the invention, air-tight property of the rotary contact point is improved, and hence dust-proof and drip-proof properties are improved.

According to the invention, with such configuration that the operating dial is retained not by surface-fitted state, but by point-fitted state at both ends thereof, variations in rotation upon rotating the operating dial may be reduced with its stable rotation state.

When the clicking members are formed of the same resin material, creak is apt to be generated when convexes slide with respect to each other. However, according to the invention, generation of creak may be prevented by employing the different types of resin.

According to the invention, the movable clicking member can hardly be inclined with respect to the fixed clicking member and hence can be stably supported including the period of rotation in which the convex of the movable clicking member climbs up the convex of the fixed clicking member.

According to the invention, since the configuration of the detent generating mechanism is such that the movable clicking member is urged outwardly by the coil spring disposed within the operating dial for allowing the same to engage the fixed clicking member, an advantageous effect such that the rotationally-operated electronic component provided with the detent generating mechanism in which the clicking members can be brought into resilient contact with each other with a large resilient contact force even when the diameter of the operating dial is reduced, and hence the preferable detent feeling can be maintained for a long time is achieved.

Although detent generating mechanism 31 and rotary contact point 21 are employed together in the example described above, detent generating mechanism 31 may be provided within the operating dial independently, or, alternatively, it may be used with the rotary mechanism other than rotary contact point 21.

What is claimed is:

1. A rotationally-operated electronic component comprising: a cylindrical roller-shaped operating dial provided with a rotary contact point on the right circular portion and a detent generating mechanism on the left circular portion, wherein the detent generating mechanism comprises:
a coil spring disposed in a state of being deflected coaxially with the center axis of rotation of the operating dial with respect to an intermediate wall in the operating dial and
a movable clicking member disposed in a state of being stored in the operating dial and urged toward the end surface of the left circular portion by an urging force of the coil spring, and is in resilient contact with a fixed clicking member disposed in a state of being fixed to the end surface side of the left circular portion wherein the coil spring and the movable clicking member rotate synchronously with the rotation of the operating dial and wherein a projection projected toward the end surface of the left circular portion of the movable clicking member climbs over a projection projected toward the intermediate wall of the fixed clicking member when being rotated, which provides the user a detent feeling together with a deflecting force of the coil spring in accordance with the movement of the movable clicking member toward the center axis of rotation.

2. A rotationally-operated electronic component according to claim 1, further comprising:

a guiding portion provided on an inner wall of a recess disposed on the left circular portion of the operating dial so as to extend in parallel with the direction of the center axis of rotation of the operating dial; and a guided portion to be movable engaged with the outer peripheral of the movable clicking member so as to be capable of moving together with the guiding portion, wherein the movable clicking member moves within the dial while the guided portion is guided by the guiding portion of the dial.

3. A rotationally-operated electronic component according to claim 1, further comprising a conical portion for positioning the coil spring on the intermediate wall in the operating dial so as to project toward the end surface of the left circular portion arranged coaxially with the center axis of rotation of the operating dial.

4. A rotationally-operated electronic component according to claim 1, wherein the rotary contact point comprises:

a contact brush fixed to the right circular portion of the operating dial so as to be capable of rotating together, the contact brush coming into resilient contact with a fixed contact point; and a contact point substrate including an O-ring being attached thereon so as to surround the outer periphery of the fixed contact point; and wherein the O-ring being in resilient contact with the right circular portion of the operating dial along the entire circumference thereof.

5. A rotationally-operated electronic component according to claim 1, wherein the operating dial is rotatably retained in a state in which the positions of the operating dial on the center axis of rotation thereof is rotatably retained in a point-fitted state.

6. A rotationally-operated electronic component according to claim 1, wherein the convexes of the movable clicking member and the fixed clicking member are formed of resin material different from each other.

7. A rotationally-operated electronic component according to claim 1, wherein the convexes of the movable clicking member are disposed at least at three positions at an equal angular positions.

* * * * *